United States Patent [19]
Le Gusquet et al.

[11] Patent Number: 5,987,364
[45] Date of Patent: Nov. 16, 1999

[54] CONTROL DEVICE FOR MAKING SAFE A FAST VEHICLE, IN PARTICULAR GUIDED BY AN OPERATOR ON BOARD THE VEHICLE OR OTHERWISE

[75] Inventors: Frédéric Le Gusquet; Marc Tissedre, both of Paris; Christophe Saglio, Antony; Philippe Salanson, Versailles, all of France

[73] Assignee: Dassault Electronique, France

[21] Appl. No.: 08/774,092

[22] Filed: Dec. 24, 1996

[30] Foreign Application Priority Data

Dec. 27, 1995 [FR] France .................................. 95 15579

[51] Int. Cl.$^6$ .......................... B60K 31/02; G06F 165/00
[52] U.S. Cl. .................................. 701/24; 701/2; 701/28; 701/301; 348/114
[58] Field of Search ............................... 701/1, 2, 23, 28, 701/41, 301; 348/114, 118, 148; 342/71; 340/989, 995, 990

[56] References Cited

U.S. PATENT DOCUMENTS

| | | |
|---|---|---|
| 4,746,977 | 5/1988 | White ...................................... 358/103 |
| 4,855,822 | 8/1989 | Narendra et al. ........................ 358/103 |
| 5,016,004 | 5/1991 | Funk et al. ........................... 340/825.69 |
| 5,155,683 | 10/1992 | Rahim ................................. 364/424.02 |
| 5,307,271 | 4/1994 | Everett, Jr. et al. ................ 364/424.02 |
| 5,315,295 | 5/1994 | Fujii ......................................... 340/936 |
| 5,341,296 | 8/1994 | Yasuno et al. ...................... 364/426.01 |
| 5,448,479 | 9/1995 | Kemner et al. ..................... 364/424.02 |
| 5,640,323 | 6/1997 | Kleimenhagen et al. .......... 364/423.98 |
| 5,684,697 | 11/1997 | Mullen .............................. 364/424.033 |

FOREIGN PATENT DOCUMENTS

| | | |
|---|---|---|
| 325298 | 7/1989 | European Pat. Off. . |
| 4 201142 | 8/1992 | Germany . |
| 2 095350 | 9/1982 | United Kingdom . |
| WO 9/002370 | 3/1990 | WIPO . |

*Primary Examiner*—Michael J. Zanelli
*Attorney, Agent, or Firm*—Christie, Parker & Hale, LLP

[57] ABSTRACT

A control device for making safe a fast vehicle comprises a servomechanism that, in response to a reference variable relating to the longitudinal speed of the vehicle, adapts in real time an actuator variable of a motor element of the vehicle until an actuator variable of a steering element corresponds to a reference variable relating to the transverse displacement of the vehicle, which makes it possible to make safe the longitudinal and transverse displacements of the vehicle, even at high longitudinal speed.

33 Claims, 10 Drawing Sheets

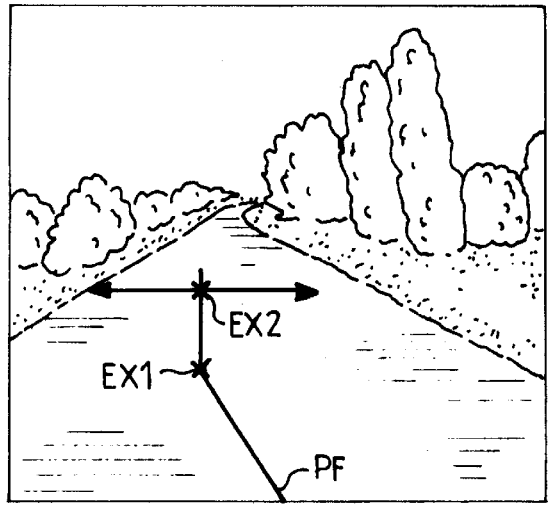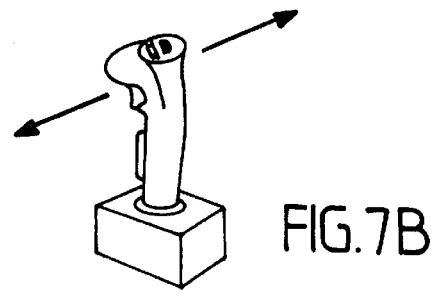
FIG.7A  FIG.7B
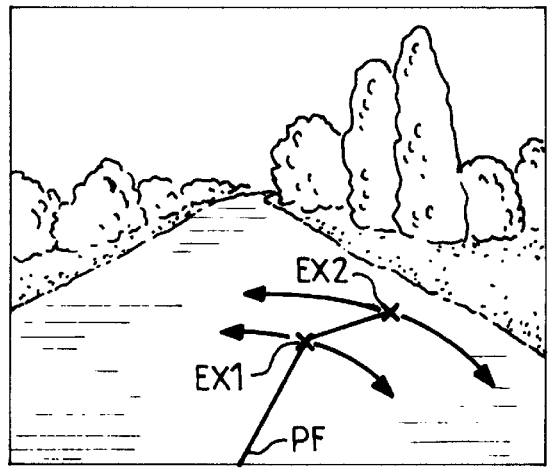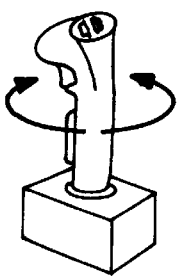
FIG.8A  FIG.8B
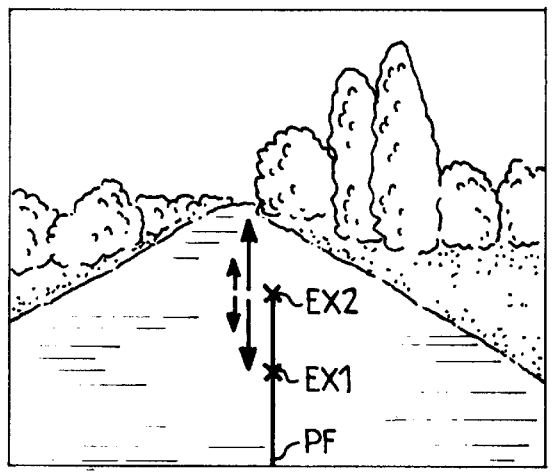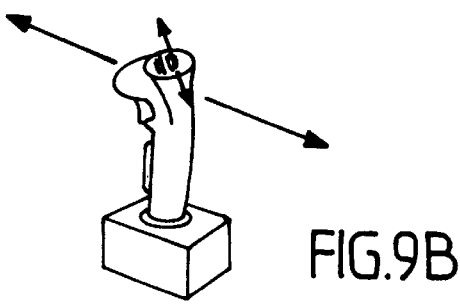
FIG.9A  FIG.9B

CONTROL DEVICE FOR MAKING SAFE A FAST VEHICLE, IN PARTICULAR GUIDED BY AN OPERATOR ON BOARD THE VEHICLE OR OTHERWISE

BACKGROUND OF THE INVENTION

The invention relates to making safe a fast land vehicle.

It has a particular non-limitative application in the guiding of a fast land vehicle by an operator on board the vehicle or otherwise.

Devices for controlling a land vehicle are already known which are capable of working out in real time, according to an appropriate servomechanism, actuator variables for controlling the motor and steering elements of the land vehicle.

The Applicants have set themselves the object of providing a servomechanism capable of making safe, even at high longitudinal speed, the longitudinal and transverse displacements of the vehicle.

SUMMARY OF THE INVENTION

This object is achieved by a control device of a vehicle comprising:

first sensor means for picking up and supplying in real time a first signal representing the current longitudinal speed of the vehicle, second sensor means for picking up and supplying in real time a second signal representing the current transverse displacement of the vehicle, first means for actuating a motor element of the vehicle in accordance with a first selected actuator variable, second means for actuating a steering element of the vehicle in accordance with a second selected actuator variable, vehicle control means for receiving first and second reference variables with a view to controlling respectively the motor and steering elements of the vehicle and working out in real time the first and second actuator variables according to a servomechanism which takes into account at least the first and second reference variables received, and the servomechanism in response to the second reference variable being capable of adapting in real time the first actuator variable until the second actuator variable corresponds to the second reference variable.

In other words, if the reference variable associated with the transverse displacement of the vehicle is incompatible with the current longitudinal speed of the vehicle, the control device according to the invention adapts the longitudinal speed coupled to a control of the steering element, such that the actuator variable relating to the transverse displacement of the vehicle meets up as rapidly as possible with the reference variable relating to the transverse displacement of the vehicle, whilst taking account of certain characteristics of the vehicle and/or of the environment in which it is moving.

In the rest of the text, the term "first reference variable" will be taken to be that associated with the longitudinal speed of the vehicle, "second reference variable" that associated with transverse displacement of the vehicle, "first actuator variable" that relating to the motor element, "second actuator variable" that relating to the steering element, "first signal received", that representing the current longitudinal speed, and "second signal received", that representing the current curvature (wheel angle) of the vehicle.

As will be seen in more detail below, the reference variables correspond usually to variables from an operator or are calculated from these operator variables.

According to a first embodiment of the invention, the servomechanism for adapting the speed comprises the following stages:

a) calculate a first maximum acceptable value for the first reference variable according to a first equation dependent on the first and second signals received and having characteristics relating to the vehicle and/or the environment in which it is moving, b) compare the first maximum acceptable value with the first reference variable received, c) in the presence of a first reference variable received which is lower than the first maximum acceptable value calculated, take into account the first reference variable received as first actuator variable, whilst in the presence of a first reference variable received which is higher than or equal to the first maximum acceptable value calculated, take into account the first value calculated as first actuator variable, d) calculate a second maximum acceptable value for the second reference variable according to a second equation dependent on the first and second signals received and on the characteristics relating to the vehicle and/or to the environment in which it is moving, e) compare the second maximum acceptable value calculated with the second reference variable received, f) in the presence of a second reference variable received which is lower than the second maximum acceptable value calculated, take into account the second reference variable received as a second actuator variable, whilst in the presence of a second reference variable received which is higher than or equal to the second value calculated, take into account the second value calculated as second actuator variable, the adaptation of the first actuator variable being carried out in accordance with stages a) to c) until the second actuator variable corresponds as rapidly as possible to the second reference variable in accordance with stages d) to f), whilst taking into account certain characteristics of the vehicle and/or of the environment in which it is moving.

Advantageously, in order to avoid any parasite oscillations in the behaviour of the vehicle, it is proposed to introduce, according to the invention, a hysteresis in the speed adaptation. In this case, in the absence of adaptation of longitudinal speed in progress, the stage c) further provides, in the presence of a first reference variable received which is higher than or equal to the first maximum acceptable value calculated, for an announcement that adaptation is taking place and for the initialisation of the value of the preceding first actuator variable according to the first current actuator variable which has just been thus determined.

Thus, if speed adaptation is in progress, the stage b) comprises the following stages:

b1) determine a constant value representing the hysteresis of the speed adaptation servomechanism, b2) compare the first maximum acceptable value calculated and corrected according to the predetermined hysteresis value with the first reference variable received, and stage c) comprises the following stage:

c1) in the presence of a first reference variable received which is lower than the first maximum acceptable value calculated and corrected, take the first reference variable received as the first actuator variable and announce the end of adaptation, whilst in the presence of a first reference variable received which is higher than or equal to the first maximum acceptable value calculated and corrected, take into account as a first actuator variable the minimum value chosen from the group formed by the first maximum acceptable value calculated, the first reference variable received and the preceding first actuator variable, and initialise the value of the preceding first actuator variable to that of the first current actuator variable.

In practice, the characteristics relating to the vehicle are selected from the group formed by the geometric, morphological, dynamic and attitude characteristics of the vehicle, and the preceding first and second reference variables received.

In practice, the first sensor means comprise at least one instrument selected from the group formed by an encoder on a transmission shaft or wheel, a tachometer, or the like.

According to another aspect of the invention, the second sensor means comprise at least one instrument selected from the group formed by a wheel angle encoder, a wheel angle potentiometer, or the like.

In practice, the first actuator means comprise at least one element selected from the group formed by a link for controlling the brake, accelerator, gearbox, power divider, the mechanical transmission chain of the vehicle, or the like.

According to another aspect of the invention, the second actuator means comprise at least one element selected from the group formed by a control link for the steering of the vehicle or the like.

The control means of the vehicle comprise an on-board computer.

Advantageously, the first and second actuating means, as well as the motor and steering elements of the vehicle constitute active means of the vehicle for transmitting respectively a signal representing the position and/or the current state of the active means, and the control device further comprises means for receiving signals transmitted by the active means of the vehicle.

An object of the present invention is also an installation for guiding a vehicle by an operator on board the vehicle or otherwise, which is characterised in that the vehicle is equipped with the control device as described above.

A further object of the present invention is an installation in which the operator is located in a station remote from the vehicle, and which is characterised in that it comprises, on board the vehicle:

vehicle control means for working out, at a selected rate, the first and second actuator variables in response to the first and second reference variables calculated at least in part from operator variables from the operator via the station, photographing means for recording images of the environment in which the vehicle is moving, vehicle data transmission/reception means cooperating with the remote station for transmitting the images recorded to the remote station, as well as the data transmitted by the active means and sensors of the vehicle and for receiving the operator variables from the operator via the station, in that it comprises at the remote station:

station data transmission/receiving means cooperating with the vehicle for receiving the images transmitted by the vehicle as well as the data transmitted by the active means and sensors of the vehicle, and for transmitting the operator variables to the vehicle, visual display means for the images thus received, selection and validation means for validating at least some operator variables relating to the movement of the vehicle with the aid of the image displayed, and data originating from the active means and sensors of the vehicle, and station control means for piloting the display means, the selection and validation means, as well as the transmission/reception means of the station.

The vehicle control means thus make it possible to carry out functions of which the operator is thus relieved. Such an installation makes it possible in particular to reduce the work load of the operator, to reduce the volume and frequency of the data travelling between the vehicle and the station, and to limit thereby even the risk of data overload of the operator, a source of fatigue and risk (failure to perceive a potential danger, i.e. poor interpretation of data plotted).

According to a further aspect of the invention, the installation comprises furthermore, on board the vehicle:

means of locating the vehicle for picking up and supplying data relating to the location of the vehicle, and in the remote station:

means for generating on the image displayed data relating to the current position of the vehicle in accordance with location data thus received, with a view of participating in the processing of at least some of the operator variables.

According to a preferred embodiment of the invention, the selection and validation means are for selecting a predetermined mobility mode of the vehicle, selected from the group formed by the mobility mode by points of passage, the mobility mode by segment, the mobility mode by turning control, and the mobility mode by turning speed control.

These different modes of mobility, arranged above in order of decreasing automation, each have operator variable interfaces which can be used directly to implement selected functions without having to use the automatic mechanisms of a higher level. Moreover, each mobility mode is exclusive one of another.

In practice, the selection and validation means comprise a keyboard or the like for selecting the mobility mode of the vehicle.

Advantageously, the selection and validation means comprise a handle control for the selection and validation of certain operator variables and a lever associated with the selection and validation of the operator variable relating to the longitudinal cruising speed of the vehicle.

In practice, the mobility mode by segment comprises, in association with the selection and validation of an operator variable relating to the longitudinal cruising speed of the vehicle, the following stages:

i) on the side of the operator, select and validate on the image displayed an operator segment of selected length and orientation, and transmit to the control means of the vehicle the operator segment thus selected and validated, and ii) on the side of the vehicle control means, calculate at a selected rate, the values of the different first and second reference variables in accordance with the operator variables thus received, and determine the first and second actuator variables in accordance with the first and second reference variables thus calculated.

In the mobility mode by segment, the handle control comprises means for designating on the image displayed an operator segment of variable length, having first and second mobile extremities, the initial mobile extremity being connected to a fixed point of the image corresponding to a fixed point selected on the vehicle and the final extremity defining the point of the environment where the vehicle must go and stop.

Advantageously, the handle control is capable of being displaced rectilinearly and/or in rotation by the operator along the rectangular axes X, Y And Z in a separate and/or cumulative manner.

Firstly, the handle control is capable of being displaced by the operator along the Y axis perpendicular to the longitudinal displacement axis of the vehicle in order to move the final extremity of the operator segment along the Y axis, the operator segment being parallel to the longitudinal axis of the vehicle.

Secondly, the handle control is capable of being moved by the operator along the X axis parallel to the longitudinal displacement axis of the vehicle to move the final extremity of the operator segment along the X axis, the operator segment being parallel to the longitudinal axis of the vehicle.

Thirdly, the handle control is capable of being rotated by the operator relative to the Z axis perpendicular to the axis of longitudinal displacement of the vehicle in order to apply a curvature to the initial and final extremities of the operator segment relative to the Z axis.

Advantageously, the stage i) comprises furthermore the stage consisting in determining an operator margin granted by the operator to the vehicle in the automatic control over the operator segment thus validated, and the stage ii) consists in taking into account this operator margin in the automatic control of the vehicle.

According to yet a further aspect of the invention, in the mobility mode by turning speed control in association with the selection and validation of an operator variable relating to the longitudinal cruising speed of the vehicle, the handle control is capable of being moved by the operator along the Y axis perpendicular to the axis of longitudinal displacement of the vehicle, in order to apply an operator variable relating to the turning speed of the vehicle in a first range of turning speed, whilst the handle control is capable of being rotated by the operator relative to the axis Z perpendicular to the axis of longitudinal displacement of the vehicle in order to apply an operator variable relating to the turning speed in a second speed range different from the first range.

According to a further aspect of the invention, the mobility mode by turning control in association with the selection and validation of an operator variable relating to the longitudinal cruising speed of the vehicle comprises the following stages;

1) provide on the image displayed an axis forming a virtual horizon for the vehicle in the environment in which it is moving,
2) provide on the horizon a first indicator capable of moving along said horizon and of indicating the current turning of the vehicle on the horizon,
3) provide on the horizon a second indicator capable of moving along the horizon and of indicating the reflection of the current position of the handle control,
4) provide on the horizon a third indicator capable of moving along the horizon and of indicating the operator variable relating to the turning of the vehicle, and
5) select and validate by means of the handle control the operator variable relating to the turning by means of the first and second indicators.

Advantageously, the handle control comprises means whereby, during displacement of the vehicle, it is possible to change from the mobility mode by turning speed control to the mobility mode by turning control and vice versa.

According to yet a further aspect of the invention, in the mobility mode by points of passage the handle control comprises means for designating on the image displayed at least one point defining the point in the environment where the vehicle must go and stop.

In practice, the mobility mode by points of passage, in association with the validation of an operator variable relating to the longitudinal cruising speed comprises the following stages:

designate in the image displayed a plurality of points of passage forming an operator trajectory, the vehicle having to go and stop at the last point on the operator trajectory, validate the entirety or part of the operator trajectory thus designated, and on the side of the vehicle control means, work out at a selected rate the different first and second reference variables as a function of the operator trajectory thus validated and of the current position of the vehicle.

Advantageously, the mobility mode by points of passage comprises in addition a swerve-type autonomous behaviour of the vehicle, set up automatically or in response to a command from the operator, with a view to avoiding an obstacle if necessary.

In practice, the autonomous behaviour in the form of automatic swerving comprises the following stages:

provide detection means for detecting an obstacle on the operator trajectory of the vehicle, effect a deviation from the operator trajectory of the vehicle so as to avoid the obstacle thus detected, whilst taking into account the operator margin, the deviation being carried out at a longitudinal speed compatible with the characteristics of the vehicle and/or of the environment in which it is moving, maintain the deviation until the obstacle has been passed, and return to the operator trajectory of the vehicle after passing the obstacle.

As a modification, the autonomous behaviour in the form of operator swerve comprises the following stages;

on the image displayed, in response to a selected event by the operator, determine an operator deviation relative to the operator trajectory, work out at selected rate the different first and second reference variables, taking into account the operator deviation thus determined from the operator trajectory and from the current position of the vehicle.

In practice, the transmission/reception means of the station and of the vehicle communicate with one another according to a suitable communication technology selected from the group formed by radio-frequency technology, cable technology using fibreoptic or electrical cable, or the like.

Most advantageously, with a certain operator variable of a certain mobility mode is associated a validity distance corresponding to the spatial validity of the operator variable, and in the absence of at least one new operator variable after passing through the validity distance, the vehicle control means bring about the halting of the vehicle until at least one new operator variable is received.

The present invention also has the object of a method of control of a vehicle implemented by the control device described above.

It also has the object of a method of guiding a vehicle implemented by an installation described above.

Further features and advantages of the invention will appear from the detailed description below, taken in conjunction with the drawings.

BRIEF DESCRIPTION OF THE DRAWINGS

FIGS. 7A and 7B show diagrammatically the displacement of the handle control in order to designate the operator segment along the Y axis according to the invention;

FIGS. 8A and 8B show diagrammatically the displacement of the handle control in order to designate along the Z axis the operator segment according to the invention;

FIGS. 9A and 9B show diagrammatically the displacement of the handle control in order to designate along the X axis, the operator segment according to the invention;

DETAILED DESCRIPTION OF THE PREFERRED EMBODIMENT

Figure 1:
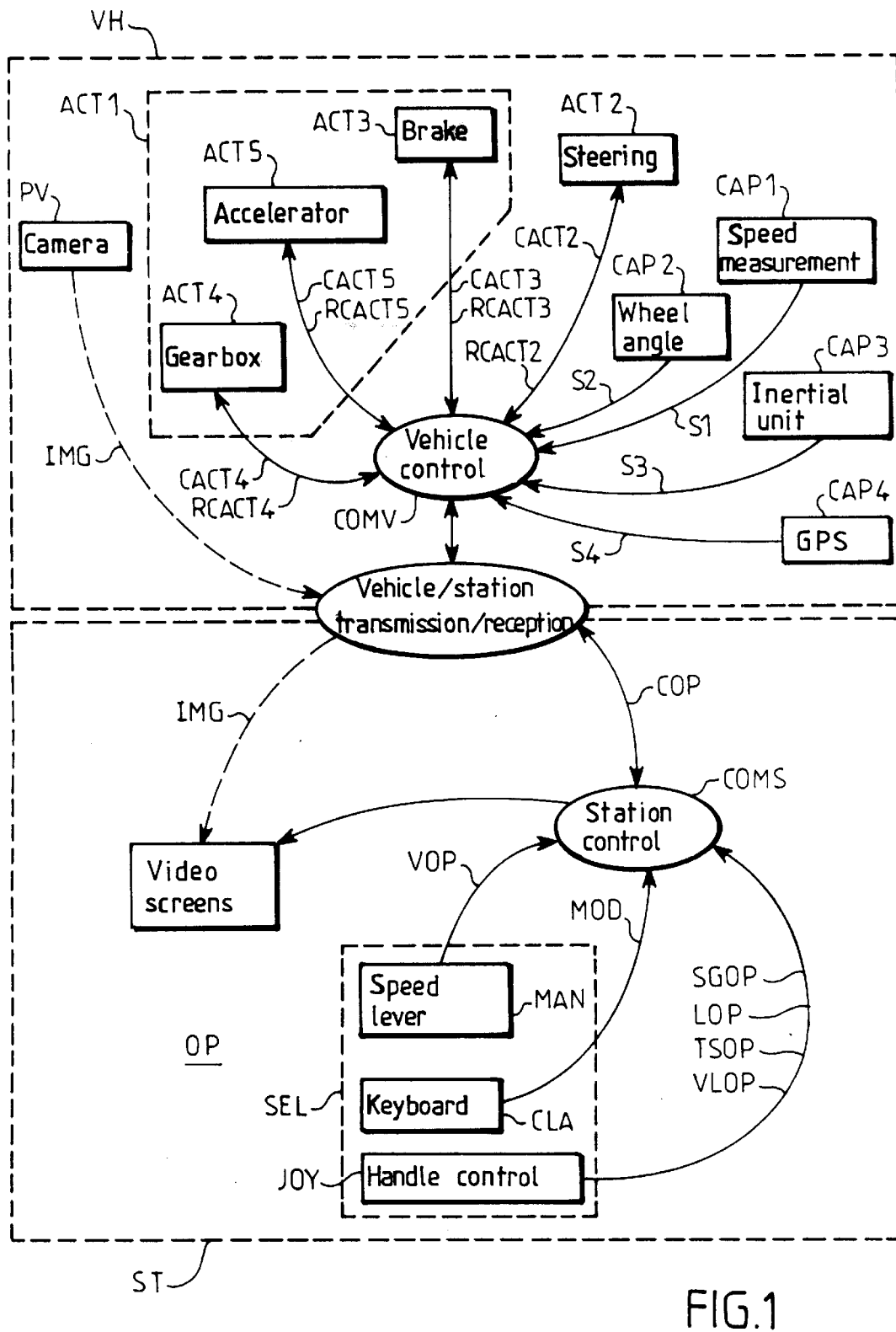
FIG. 1 is a diagrammatic view of the essential component means of the installation for guiding between a land vehicle and a remote station according to the invention.

In FIG. 1, the reference VH designates a land vehicle guided by an installation for guiding according to the invention.

The land vehicle VH can be a thermal or electric powered vehicle equipped with conventional means for this type of vehicle. It is equipped with an autonomous mode in which it is capable of being guided by an operator on board the vehicle or otherwise. The land vehicle can also be a dedicated mobile robot.

The land vehicle is equipped with actuator means ACT1 of the motor element and actuating means ACT2 of the steering element.

In general, the actuating means ACT1 comprise at least one element selected from the group formed by a control link for the brake ACT3, the accelerator ACT5, for the gearbox ACT4, for the power divider, for the mechanical transmission link of the vehicle, or the like.

The actuating means ACT2 comprise at least one element selected from the group formed by a control link of the vehicle steering or the like.

According to the invention, control means are provided for ensuring the rapid displacement of the vehicle.

These control means pilot, in addition to the actuating means mentioned above, sensor means CAP1 and CAP2 capable of detecting and supplying in real time respectively a first signal S1 representing the current longitudinal speed of the vehicle and a second signal S2 representing the current transverse displacement of the vehicle.

The control means COMV are connected bidirectionally to the above-mentioned actuating means ACT1 and ACT2. In the direction control means COMV-actuating means, a signal representing an actuator variable CACT is routed, whilst in the direction actuating means to control means, a signal representing the position and/or the current state of the actuating means is transmitted RCACT.

This signal RCACT representing the position and/or the state of the actuating means designates the return of the actuator variable. It is routed towards the control means.

For example, the control link of the brake ACT3 receives the actuator variable CACT3 and sends by return the signal RCACT3.

The sensor means CAP1 comprise at least one instrument selected from the group formed by an encoder on a transmission shaft or wheel, a tachometer or the like.

The sensor means CAP2 comprise at least one instrument selected from the group formed by a wheel angle encoder, a wheel angle potentiometer, or the like.

In general, the control means COMV receive first and second reference variables CREF1 and CREF2 (calculated at least in part from operator variables which will be described more fully below) with a view to controlling respectively the motor and steering elements of the vehicle and working out in real time the first and second actuator variables CACT1 and CACT2 according to a servomechanism taking into account at least the first and second signals detected S1 and S2 and of the first and second reference variables CREF1 and CREF2 thus received.

In practice, the control of the motor element ACT1 of the vehicle is effected at least by means of the control link of the brake ACT3, of the gearbox ACT4, and of the accelerator ACT5. In these circumstances, from the actuator variable CACT1, the servomechanism calculates at any time the actuator variables CACT3, CACT4 and CACT5 associated respectively with the control link for the brake ACT3, the gearbox ACT4 and the accelerator ACT5.

In order to make the vehicle safe, particularly in the case of a high longitudinal speed, a servomechanism according to the invention is provided, in which in response to the second reference variable CREF2 the control means adapt in real time the first actuator variable CACT1 until the second actuator variable CACT2 corresponds to the second reference variable CREF2.

In other words, if the reference variable CREF2 relating to the transverse movement of the vehicle is incompatible with the current speed S1 of the vehicle, the control means COMV effect an adaptation of the longitudinal speed coupled to a command of the steering element, such that the actuator variable CACT2 joins up as rapidly as possible with the reference variable CREF2 relating to transverse displacement, whilst taking into account certain dynamic constraints of the vehicle as well as certain features of the environment in which it is moving.

Figure 3:
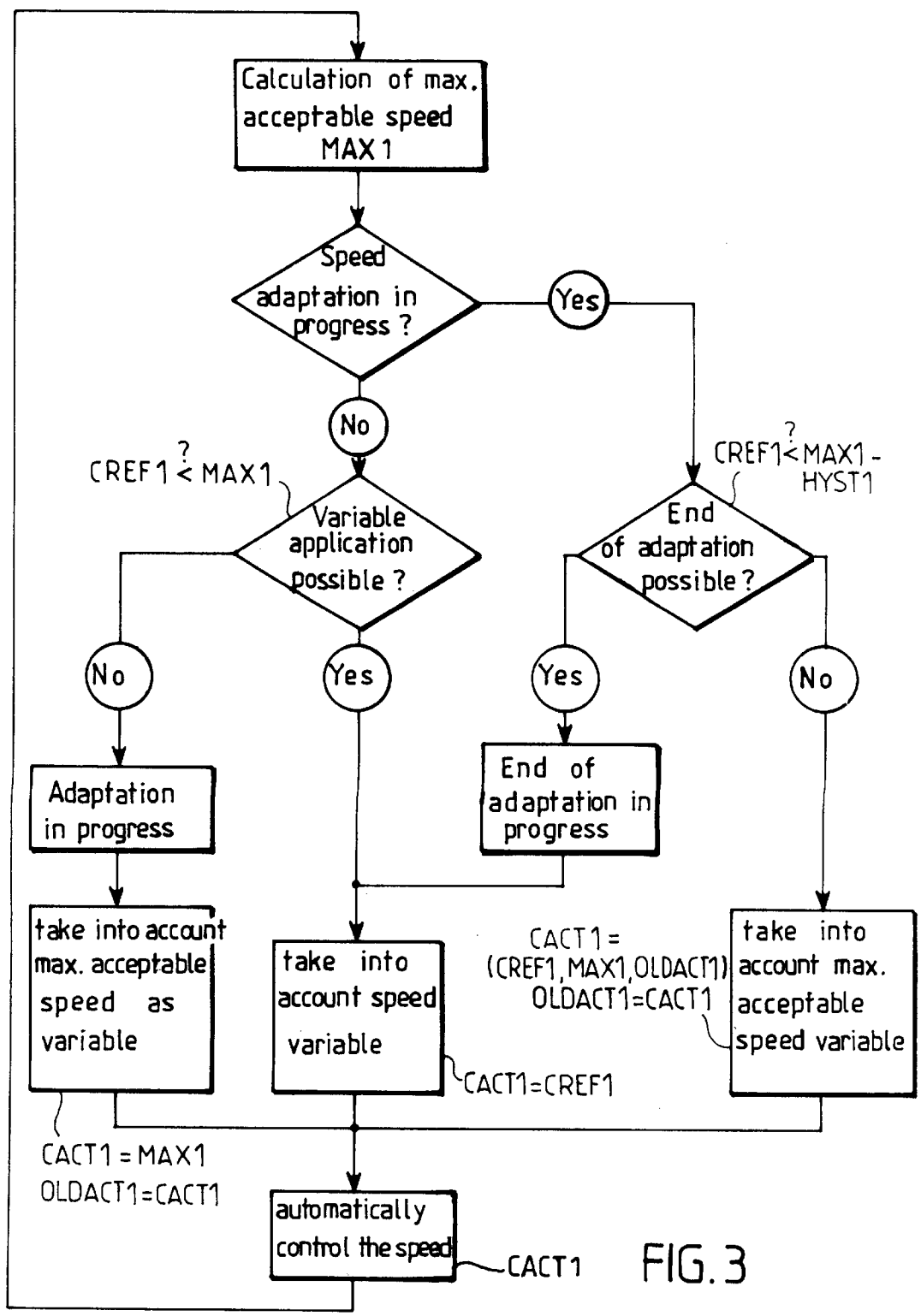
FIG. 3 is a flow chart showing the adaptation of longitudinal speed according to the invention.
Figure 4:
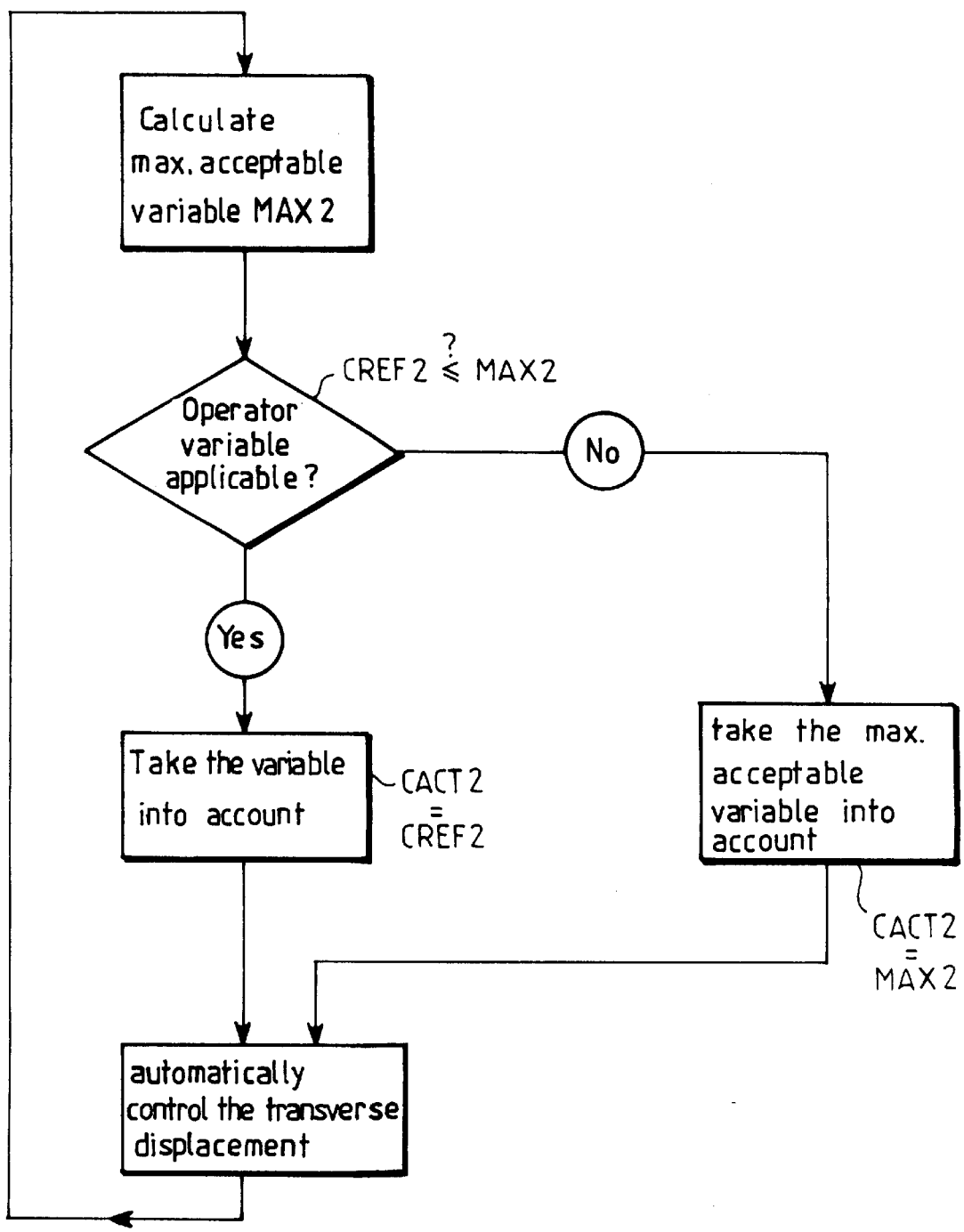
FIG. 4 is a flow chart showing the adaptation of the transverse displacement according to the invention.

With reference to FIGS. 3 and 4, the speed adaptation servomechanism according to the invention comprises the following stages:

a) calculate a first maximum acceptable value MAX1 for the first reference variable CREF1 according to a first equation L1 dependent on the first and second signals received S1 and S2 and on characteristics relating to the vehicle VH and/or the environment in which it is moving;

b) compare the first maximum acceptable value MAX1 with the first reference variable received CREF1;

c) in the presence of a first reference variable received CREF1 which is lower than the first maximum acceptable value calculated MAX1, take into account the first reference variable received CREF1 as the first actuator variable CACT1, whilst in the presence of a first reference variable received CREF1 which is higher than or equal to the first maximum acceptable value calculated, take into account the first value calculated MAX1 as first actuator variable CACT1, d) calculate a second maximum acceptable value MAX2 for the second reference variable CREF2 according to a second equation L2 dependent on the first and second signals received S1 and S2 and on characteristics relating to the vehicle VH and/or the environment in which it is moving;

e) compare the second maximum acceptable value calculated MAX2 with the second reference variable received CREF2;

f) in the presence of a second reference variable received CREF2 which is lower than the first maximum acceptable value calculated MAX2, take into account the second reference variable received CREF2 as the second actuator variable CACT2, whilst in the presence of a second reference variable received CREF2 which is higher than or equal to the second value calculated, take into account the second value calculated MAX2 as second actuator variable CACT2.

The adaptation of the first actuator variable CACT1 is in this case effected in accordance with stages a) to c) until the second actuator variable CACT2 corresponds as rapidly as possible to the second reference variable CREF2 in accordance with stages d) to f), whilst taking into account certain characteristics of the vehicle and/or the environment in which it is moving.

In other words, the servomechanism comprises two mutual operations. The first operation consists in adapting the current speed of the vehicle to the curvature specified by the operator, whereas the second stage consists in adapting the angle of rotation of the steering wheel to the current speed and vice versa. These two operations take into account in practice the current context of the vehicle as well as the environment in which it is moving.

The combination of these two stages makes it possible—if the operator margin, which will be described more fully below, is sufficient—to extricate the vehicle from an awkward situation without leaving to the operator the management of the potential of adherence as well as the margin in respect of tipping over of the vehicle. This servomechanism actually consists in a reflex action implemented by the control means for stabilising the vehicle if overtaxed by the operator.

It should be noted that the control means according to the invention are transposable to the driving of a conventional vehicle in which the operator is on board the vehicle and uses the servomechanism according to the invention in a manner similar to the anti-blocking system.

In FIGS. 5A to 5D are shown time graphs illustrating the action of speed adaptation according to the invention.

For example, in response to a steering adjustment (operator variable intended for the working out of the second reference variable) at a current longitudinal speed S1 of 80 km/h, the vehicle, equipped with the servomechanism according to the invention, reacts by acting on the braking control (first actuator variable) in order to stabilise the transverse acceleration of the vehicle. This stabilisation of the transverse acceleration is the result of a suitable control of the wheel angle of the vehicle (second actuator variable) which makes the wheels of the vehicle turn in a safe manner compatible with the current speed of the vehicle. Thus the intention of the operator (steering adjustment at 80 km/h) is indeed taken into account (in this case a sudden deviation from the trajectory on one side), but its implementation is made safe. It should be noted that this adaptation mechanism can also be implemented to help the operator negotiate a bend approached at too great a speed.

Figure 5A:
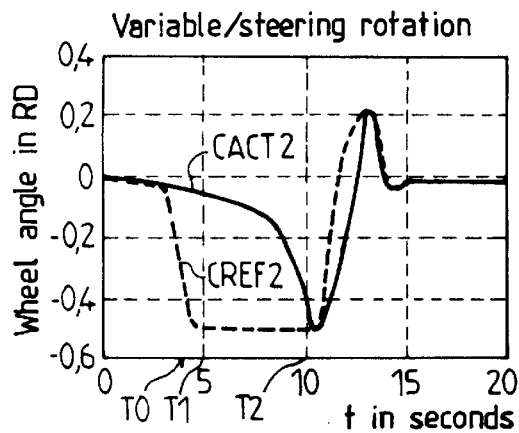
FIGS. 5A to 5D are time graphs showing the adaptation of speed in response to an adjustment of the steering according to the invention.

In FIG. 5A, the reference variable CREF2 relating to the transverse displacement of the vehicle calculated from the operator variable "steering adjustment" is shown in a dotted line, whereas the actuator variable CACT2 relating to the transverse displacement is shown in a solid line.

It should be noted that the value of the variable CACT2 progressively joins up with the value of the variable CREF2 (in this case over an interval of 6 s). This time interval is variable. It can be determined according to a special equation taking into account the characteristics of the vehicle and of the environment in which it is moving.

Figure 5C:
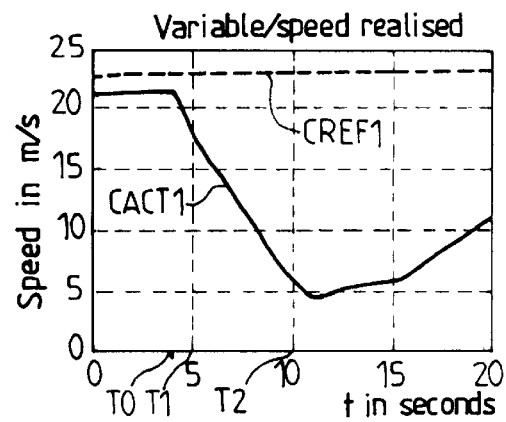

In FIG. 5C, it can be seen that the current longitudinal speed S1 and the reference variable CREF1 are substantially constant around 23 m/sec. On the other hand, in response to the reference variable CREF2 (steering adjustment at T0=4s), the servomechanism acts on the actuator variable CACT1 (in this case braking) in order to achieve a speed of 5 m/sec, substantially 6 seconds after implementation of the steering adjustment.

Figure 5B:
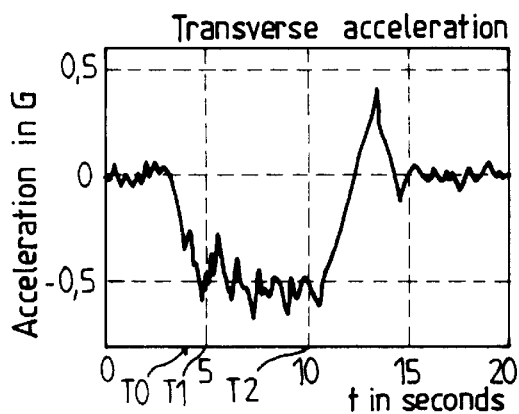
Figure 5D:
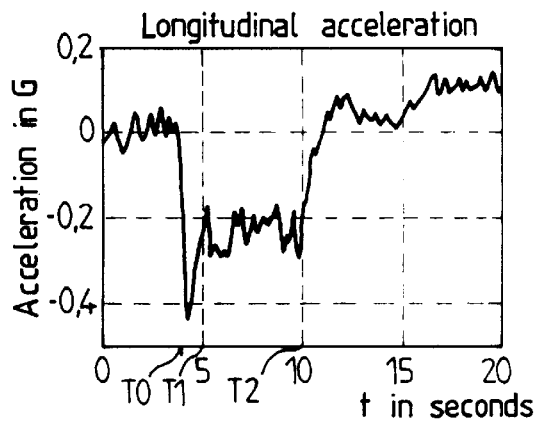

FIGS. 5B and 5D show transverse and longitudinal accelerations of the vehicle during the speed adaptation according to the invention.

It should be noted that during the interval T1=5 s and T2=10s, i.e. during adaptation of the second actuator variable CACT2 according to the invention, the transverse and longitudinal accelerations are stabilised, which makes safe the longitudinal and transverse displacements of the vehicle, even at high longitudinal speed.

The stabilising servomechanism relating to the speed adaptation in this case has an effect both on the transverse displacement and on the longitudinal speed stabilisation of the vehicle. The transverse automatic control in this case limits at any time the wheel angle variable realisable as a function of the dynamic stresses of the moment.

The calculation of the maximum acceptable value MAX2 for the reference variable CREF2 (relating to the transverse displacement of the vehicle) can be written as follows:

$$\text{MAX2} = \min(\beta_{geo\ max}, \text{Arctan}(1.\gamma t/S1^2)) \qquad (I)$$

In the same manner, the first maximum acceptable value MAX1 can be written as follows:

$$\text{MAX1} = \sqrt{\gamma t.1 / |\tan(\max(S2, \beta_{cons}))|} \qquad (II)$$

where S2: current angle of vehicle wheels,

Max2: maximum authorised angle of wheels associated with dynamic stresses, $\beta_{cons}$: wheel angle variable sent by the operator (or emanating from the operator variable). It takes into account the geometric stresses of the vehicle (full lock), γt: maximum authorised transverse acceleration for the vehicle, 1: wheel base of the vehicle, S1: current speed of the vehicle, MAX1: maximum acceptable speed for the vehicle linked to the current behaviour of transverse displacement (intention of the operator).

Obviously, the formulae (I) and (II), i.e. equation L1 and L2, proposed here constitute simplified examples from the point of view of the hypotheses applied in order to facilitate understanding of the invention.

Advantageously, in the course of adaptation, the calculation of the maximum acceptable values MAX1 and MAX2 take into account the characteristics of the vehicle and/or the environment in which it is moving. These characteristics relate to the current context. More precisely, the characteristics relating to the vehicle are selected from the group formed by the geometric, morphological, dynamic and attitude (from a sensor CAP3 of the central inertial type capable of receiving a signal S3 representing the current attitude of the vehicle—pitch, roll, yaw, speed of orientation and acceleration of orientation) characteristics of the vehicle and the preceding first and second reference variables received.

One of the advantages of the speed adaptation according to the invention is that it is easy to implement. If the operator is surprised by the appearance of an obstacle to be avoided, for example in its trajectory, he requests strongly (reflex action) transverse movement of the vehicle (steering adjustment) and the servomechanism according to the invention described above immediately comes into action.

Advantageously, there is further provided in the speed adaptation servomechanism a mode taking into account the hysteresis of the servomechanism.

Figure 2:
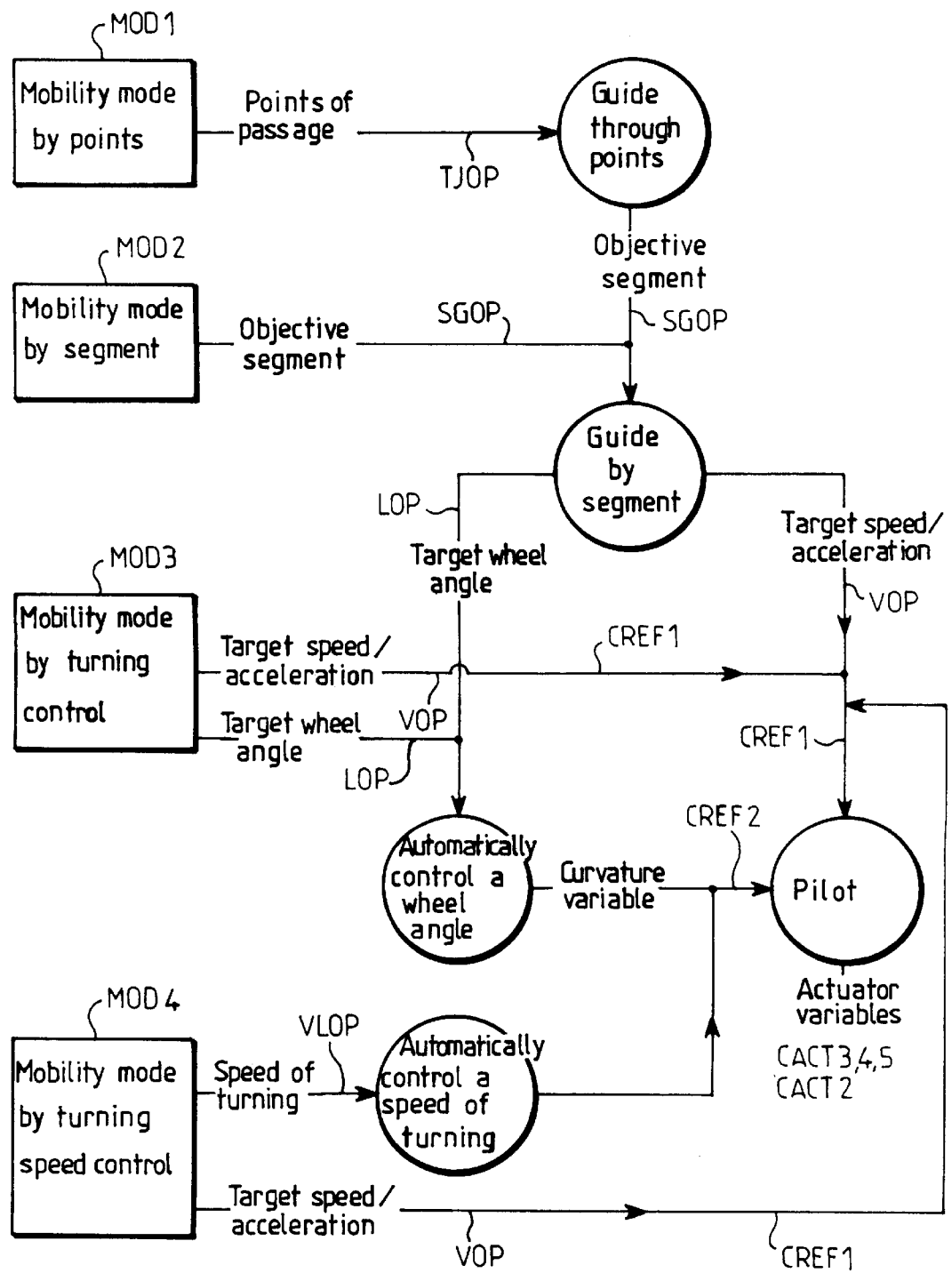
FIG. 2 is a flow chart showing various mobility modes of the vehicle and their associated operator variables according to the invention.

The use of a hysteresis in the speed adaptation algorithm according to the invention comprises the following stages relating to FIGS. 2 and 3.

In the absence of adaptation of longitudinal speed in progress, the stage c) further provides, in the presence of a first reference variable received CREF1 which is higher than or equal to the first maximum acceptable value calculated MAX1, for an announcement that adaptation is in progress and for the initialisation of the value of the preceding first actuator variable OLDCACT1 according to the first current actuator variable just determined OLDCACT1=CACT1.

If a speed adaptation is in progress, the stage b) then comprises the following stages:

b1) determine a constant value (e.g. 1 m/s) representing the hysteresis of the speed adaptation servomechanism HYST1;

b2) compare the first maximum acceptable value calculated and corrected according to the predetermined hysteresis value MAX1-HYST1 with the first reference variable received CREF1.

The stage c) therefore comprises the following stage:

c1) in the presence of a first reference variable received CREF1 which is lower than the first maximum acceptable value calculated and corrected MAX1-HYST1, take the first reference variable received CREF1 as the first actuator variable CACT1 and announce the end of adaptation.

Whereas in the presence of a first reference variable received which is higher than or equal to the first maximum acceptable value calculated and corrected MAX1-HYST1, it is proposed to take into account as first actuator variable CACT1 the minimum value selected from the group formed by the first maximum acceptable value calculated MAX1, the first reference variable received CREF1, and the preceding first actuator variable OLDCACT1, and to initialise the value of the preceding first actuator variable to that of the first current actuator variable OLDCACT1=CACT1.

In practice, the control means COMV comprise at least one on-board computer or the like. For example, the computer is of the type 68XXX by Motorola.

Obviously, the operator may or may not be on board the vehicle.

In a preferred embodiment of the invention, with reference to FIG. 1, the operator OP is located in a remote station ST of the vehicle.

In these circumstances, the invention relates to a guiding installation in which it is proposed to equip the vehicle with the above-mentioned control means which work out the first and second actuator variables CACT1 and CACT2 in response to the first and second reference variables CREF1 and CREF2 calculated at least in part from operator variables COP originating from the operator via the station.

Figure 16:
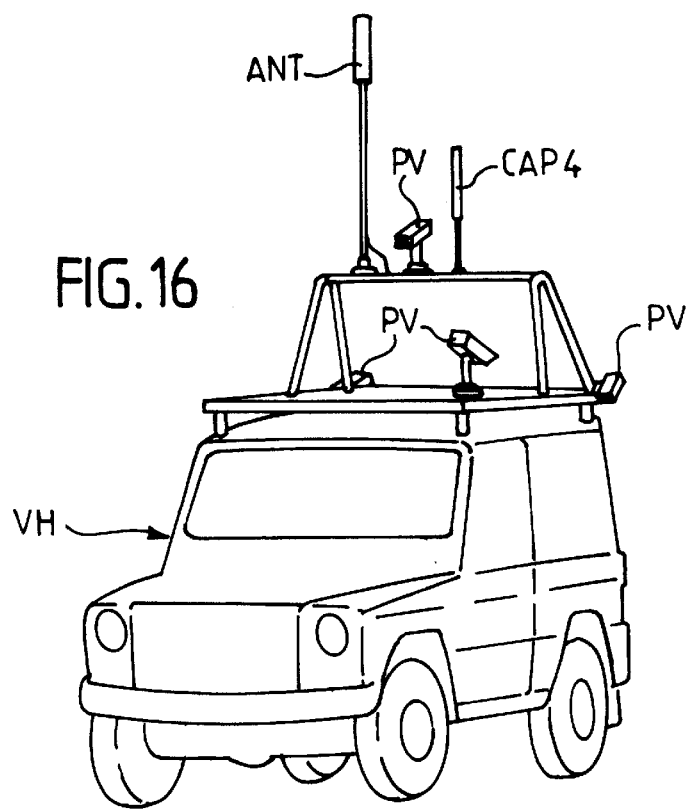
FIG. 16 is a view of a land vehicle equipped with the control device according to the invention.

It is necessary (FIG. 16) to equip the vehicle additionally with photographing means PV for recording images of the environment in which the vehicle is moving, as well as vehicle transmission/reception means ANT for exchanging data with the remote station in order to transmit the images thus recorded to the remote station, as well as data RCACT, S1, S2, S3 sent by the active and sensor means of the vehicle, and in order to receive the operator variables COP originating from the operator via the station.

For example, the photographing means comprise 4 cameras, one oriented in the forward direction of displacement of the vehicle, one oriented in the backward direction of displacement of the vehicle, and two oriented laterally.

Figure 17:
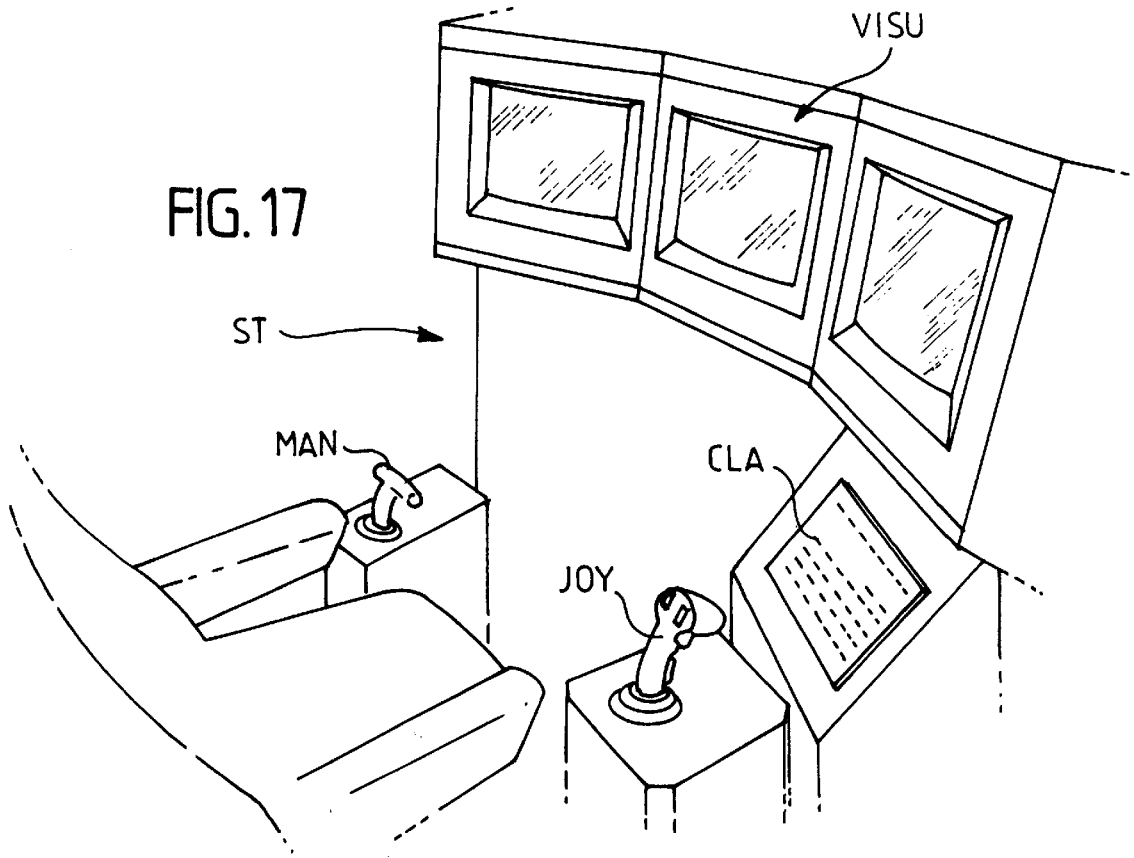
FIG. 17 is a diagrammatic view of the operator post located in the remote station according to the invention.

At the remote station ST (FIG. 17) are provided, conversely, station data transmission/reception means cooperating with the vehicle in order to receive the images IMG transmitted by the vehicle, as well as data RCACT, S1, S2, S3 sent by the active and sensor means of the vehicle, and in order to transmit to the vehicle the operator variables COP.

Advantageously, the station is equipped with display means VISU for the images thus received. For example, the display means comprise 3 video screens, the central screen being associated with the broadcasting of images from the cameras oriented in the direction of displacement of the vehicle (forward and backward directions) and the lateral screens being associated with the broadcasting of images from the lateral cameras.

Selection and validation means SEL permit the operator to select and validate at least certain operator variables COP relating to the displacement of the vehicle by means of the image displayed IMG, and of data RCACT, S1, S2 and S3 from the active means of the vehicle, as well as from the sensor means CAP1, CAP2 and CAP3.

Station control means COMS pilot the display means, the selection and validation means and the transmission/reception means of the station.

Obviously, when the operator is in the vehicle, the vehicle and station transmission/reception means are useless.

Preferably, it is proposed to have on board the vehicle means for locating the vehicle which are capable of picking up and sending data S4 relating to the locality of the vehicle. These locating means comprise sensor means CAP4 connected to the vehicle control means COMV, which manage the data S4 thus picked up. For example, the sensor means CAP4 are of the GPS (global positioning system) or absolute positioning beacon type.

On the side of the remote station ST are provided means for generating on the image displayed data relating to the current location of the vehicle in accordance with locality data thus received with a view to partaking in the working out of some at least of the operator variables TJOP and SGOP, which will be described more fully below.

The selection and validation means SEL permit the operator to select and validate a selected mobility mode MOD of the vehicle. Thus he may select a mobility mode from the group formed by the mobility mode by points of passage MOD1, mobility mode by segment MOD2, mobility mode by turning control MOD3, and mobility mode by turning speed control MOD4.

These different mobility modes form different successive layers. Each of these layers has operator variable interfaces, which can be directly used by the operator to implement functions without having to use the functions of a higher order.

These are therefore mobility modes which are exclusive one to another.

FIG. 2 shows a flow chart of the different mobility modes.

The different modes are in this case arranged in order of decreasing automation. The mode having the highest level of automation is MOD1.

The mobility mode by points of passage is known as a remote guidance mode, which consists in displacing a vehicle remotely by controlling the trajectory TJOP on which it is automatically controlled. The operator specifies a sequence of points of passage. Progress is in leaps.

The mobility mode MOD2 by segment is also a remote guidance behaviour in which the operator specifies an objective segment SGOP in which the vehicle is automatically controlled.

The mobility modes MOD3 and MOD4 belong to the mode of remote piloting, in which it is proposed to displace the vehicle remotely by controlling its longitudinal and transverse displacements.

The operator specifies a turn LOP or a turning speed VLOP associated with a longitudinal displacement speed VOP (possibly complemented by an acceleration for making up speed).

In this case, "turning" is understood to mean the orientation of the vehicle in the environment in which it is moving. The turning of the vehicle may in this case be different from the course of the vehicle insofar as it does not depend on a magnetic or other point.

It should be noted that the speed adaptation described with reference to FIGS. 3 and 4 is capable of being implemented in any mobility mode described above. This reflex action also makes it possible to react to the appearance of a situation considered to be dangerous, while the mobility mode of a higher level is capable of taking the situation into account and of generating operator variables which cancel the danger situation and therefore the reflex action.

In order to select the mobility mode of the vehicle, a keyboard or the like CLA is provided at the station ST.

As part of the selection and validation means SEL, in addition a handle control of the joystick type JOY is provided for selection and validation of certain operator variables COP and a lever MAN associated with the selection and validation of the operator variable relating to the cruising speed of the vehicle VOP.

Figure 6:
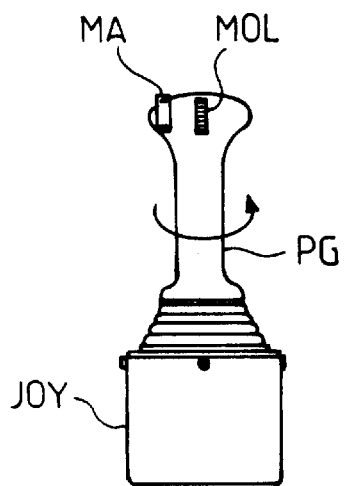
FIGS. 6A and 6B are diagrammatic views of the handle control according to the invention.
Figure 6:
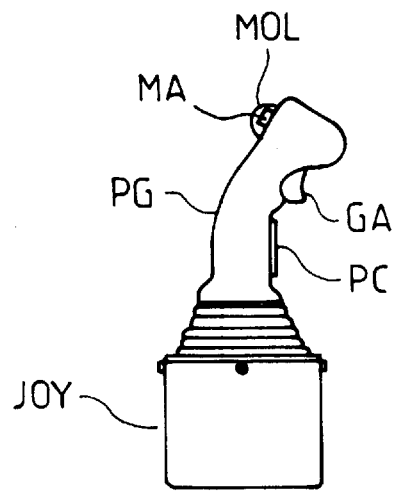

In FIGS. 6A and 6B, a handle control is shown.

It comprises conventionally a handle PG. This handle is equipped with a trigger dedicated in particular to the validation of operator variables and with a takeover button PC.

The end of the handle is equipped with a roller MOL dedicated in particular to the mobility mode by segment MOD2 as well as a dispatch/cancellation button MA dedicated in particular to the mobility mode by points of passage MOD1.

With reference to FIGS. 7A to 9B, in the mobility mode by segment MOD2, the handle control JOY comprises means for designating on the image displayed an operator segment SGOP of a variable length, having first EX1 and second mobile extremities EX2. The initial extremity EX1 is connected to a fixed point PF of the image corresponding to a selected fixed point on the vehicle. The final extremity EX2 defines the point in the environment where the vehicle must go and stop.

In this mobility mode by segment MOD2, the operator specifies the general direction which he wishes to take in the vehicle by designating directly from a video image a straight segment SGOP on which the vehicle will be automatically controlled as if it were a trajectory.

The vehicle also takes into account a cruising speed VOP, which it will try to maintain whilst adapting to the current conditions.

The mobility mode by segment thus comprises, in association with the selection and validation of an operator variable VOP relating to the longitudinal cruising speed of the vehicle the following stages:

i) on the side of the operator, select and validate in the image displayed an operator segment of a selected length and orientation SGOP, and transmit to vehicle control means COMV the operator segment thus selected and validated, and ii) on the side of vehicle control means COMV, calculate at a selected rate the different values of the first and second reference variables CREF1 and CREF2 as a function of the operator variables thus received SGOP and VOP, and determine the first and second actuator variables CACT1 and CACT2 as a function of the first and second reference variables thus calculated CREF1 and CREF2.

Advantageously, the stage i) comprises in addition the stage which consists in determining an operator margin granted by the vehicle operator in the automatic control over the operator segment thus validated, and the stage ii) consists in taking into account this operator margin in the automatic control of the vehicle.

This operator margin is a distance which indicates the latitude granted by the operator to the vehicle in the automatic control over the objective segment.

This margin may be variable, i.e. of a value determined according to the wish of the operator, or fixed, determined by default by the control means.

The different successive values of the reference variables CREF1 and CREF2 are worked out and transmitted at a frequency of 5 to 10 Hz, compatible with the frequency of the data transmission/reception means operating between the station and the vehicle.

The control means implemented on the side of the vehicle permanently try to follow the objective segment SGOP thus selected and validated at the station, and transmitted at the vehicle control means.

In order to do this, the vehicle control means determine, as a function of the current speed S1 of the vehicle, a target point on the objective segment SGOP, towards which the vehicle control means automatically control the vehicle turning (turning actuator variable CACT2 to be matched by the motor and steering elements of the vehicle).

The speed adapted on the journey tends to join up with the specified cruising speed VOP, taking into account the instant stresses (dynamic stresses of the vehicle or of quality of position transmitted by the locating system) and absolutes stresses (at any time the vehicle must be able to stop without passing the extreme point of the segment EX2).

For example, the transmission/reception means of the vehicle and of the station use a radio technology in which the operator variables COP are transmitted discontinuously or periodically to the vehicle up to a frequency of 5 to 10 Hz.

Thus, in the case of a problem with transmissions or if the operator no longer wishes to send an operator variable (releasing of the trigger GA), the vehicle continues its progress until it stops at the extreme point EX2 of the last objective segment received SGOP.

The operator can send operator variables at the frequency which he desires according to his various tasks.

With reference to FIGS. 7A to 9B, the operator designates directly the operator segment SGOP on the video image displayed on his monitor VISU. To this end, he positions by means of the handle control a coloured cursor designating the extremity of the segment EX2.

The speed variable VOP is specified by a lever-type device (like a throttle control lever on an aeroplane), which holds the speed variable VOP even without further intervention by the operator. This is an advantage in that remote guidance can now be effected with the legs free from any task.

The designation of the operator segment can be carried out by two types of movements of the handle control which are non-exclusive, i.e. deviation from the trajectory (along the Y axis) or curvature (along the Z axis).

With reference to FIGS. 7A and 7B, the handle control is capable of being moved by the operator along a Y axis perpendicular to the axis of longitudinal displacement of the vehicle. The displacement along the Y axis of the handle control makes it possible to displace the final extremity EX2 of the operator segment along the Y axis. It should be noted that in this mobility mode, the operator segment thus designated is parallel to the longitudinal axis of the vehicle.

To effect a deviation of curvature to the segment, the handle control is capable of being rotated by the operator relative to a Z axis perpendicular to the axis of longitudinal displacement of the vehicle in order to apply a curvature to the initial EX1 and final EX2 extremities of the operator segment SGOP relative to the axis Z.

It should be noted that the two points of the segment EX1 and EX2 and the fixed point PF remain on one circle of variable radius.

The handle control is also capable of being displaced by the operator along an axis X parallel to the axis of longitudinal displacement of the vehicle in order to displace the final extremity EX2 of the operator segment along the X axis, the initial extremity becoming more remote in proportion to the action of the operator.

It should be noted that the distance of the final point EX2 of the segment SGOP makes it possible to increase the horizon of responsibility of the vehicle and therefore authorises the vehicle to reach higher speeds. (The more remote its final objective, the faster the vehicle is authorised to travel).

The roller MO is relevant here for fine adjustment on the X axis.

The dispatch of the objective segment SGOP to the vehicle is conditional upon an action by the operator on the trigger of the handle control (validation).

The operator can thus pilot the vehicle by validating a segment in real time. To this end, he only needs to keep the trigger permanently validated.

Figure 10:
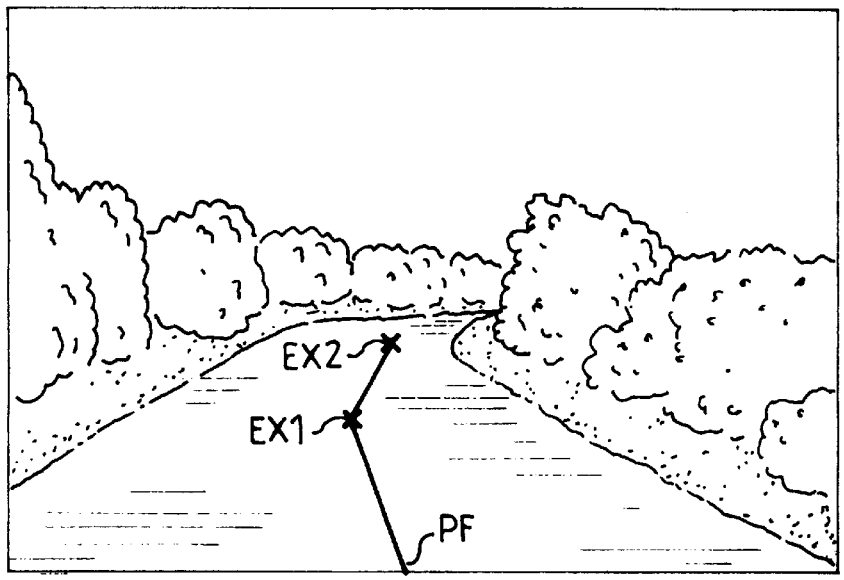
FIGS. 10 to 13 show images illustrating the negotiation of a bend in mobility mode by segment according to the invention.

FIGS. 10 to 13 show the negotiation of a bend in remote guidance by objective segments. The vehicle is halted at the approach to a bend, the operator then designates a segment SGOP before sending it to the vehicle (FIG. 10). Once validated, with the trigger on the handle control, the segment SGOP becomes the mobility variable of the vehicle. It is linked to the terrain and is displayed (FIGS. 11 to 13) in a different colour from that of the segment in the operation of selection and designation (FIG. 10).

Figure 11:
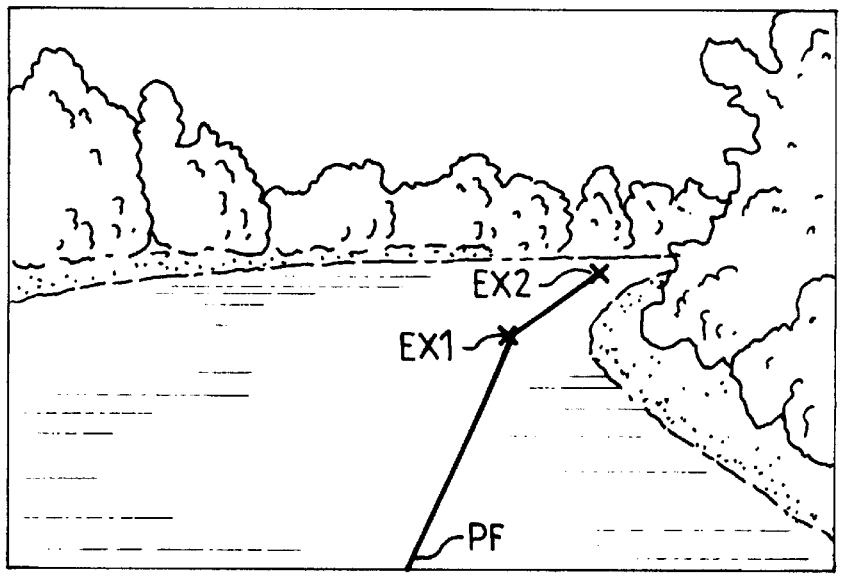
Figure 12:
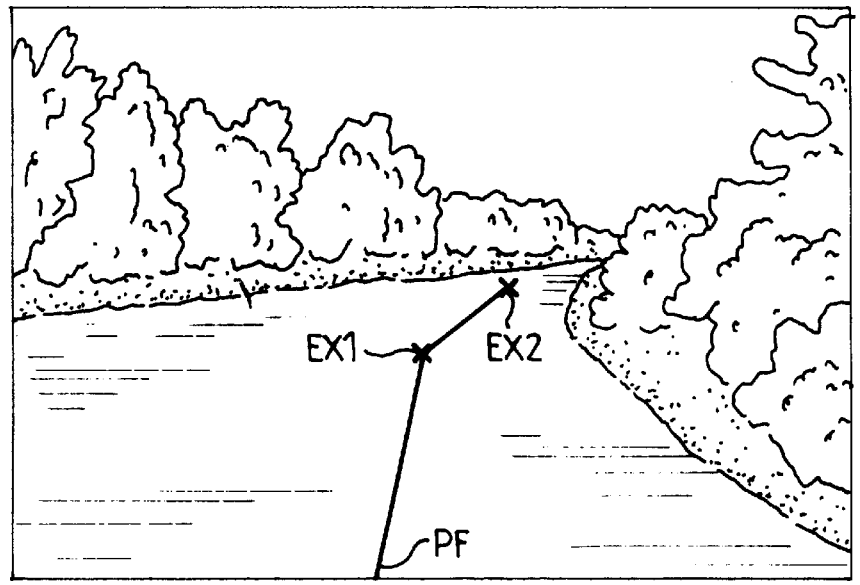
Figure 13:
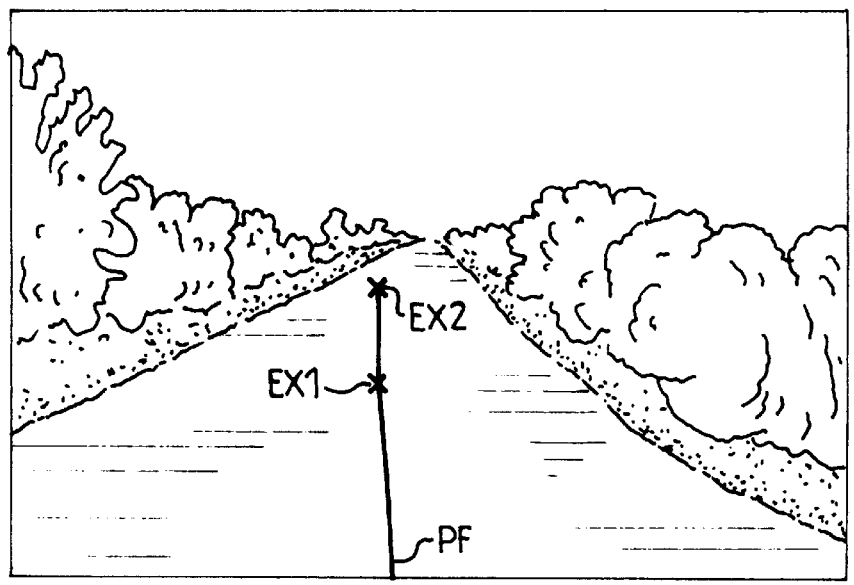

With reference to FIG. 11, the vehicle starts to be automatically controlled on the trajectory of variable defined by the validated operator segment SGOP, the operator designating the next segment.

After validation of the new segment by the operator, the vehicle is automatically controlled on the new segment thus validated.

The operator can also hold the trigger down constantly, thus guiding the vehicle in real time, the least movement of his handle control thus bringing about rotation of the vehicle.

If at any time the operator releases the validation trigger, the vehicle continues its course along the last objective segment requested until stopping at its extreme point.

Furthermore, in the mobility mode by turning speed control MOD4, in association with the selection and validation of an operator variable relating to the longitudinal cruising speed of the vehicle VOP, the handle control is capable of being moved by the operator along the Y axis perpendicular to the axis of longitudinal displacement of the vehicle in order to apply an operator variable relating to the turning speed of the vehicle VLOP in a first range of turning speeds PG1, whereas the handle control is capable of being rotated by the operator relative to the axis Z perpendicular to the axis of longitudinal displacement of the vehicle in order to apply an operator variable relating to the turning speed VLOP in a second range of speeds PG2 different from the first range PG1.

Thus, the control of transverse displacement in mobility mode MOD4 (turning speed of the vehicle) uses the two transverse axes Y and Z of the handle control.

In practice, the axis Y (right-left) controls the full dynamic range PG1 of the vehicle (full range of rotation of the steering). This is privileged control for manoeuvre, low speeds and high stresses of the vehicle (sudden change of trajectory).

On the other hand, the axis Z of rotation specifies an adjustment of transverse displacement which only uses a small percentage of the range PG2. This is the control reserved for medium- and high-speed adjustments to trajectory, whereby it is possible to make fine adjustments to a trajectory at high speed without triggering the reflex action of adaptation.

The handle control in this case only controls the transverse displacement of the vehicle, and the cruising speed VOP of the vehicle is specified through the throttle control-type lever. The taking into account of the position of this throttle control lever is for safety reasons subject to the taking over PC of the handle control by the operator.

Figure 14:
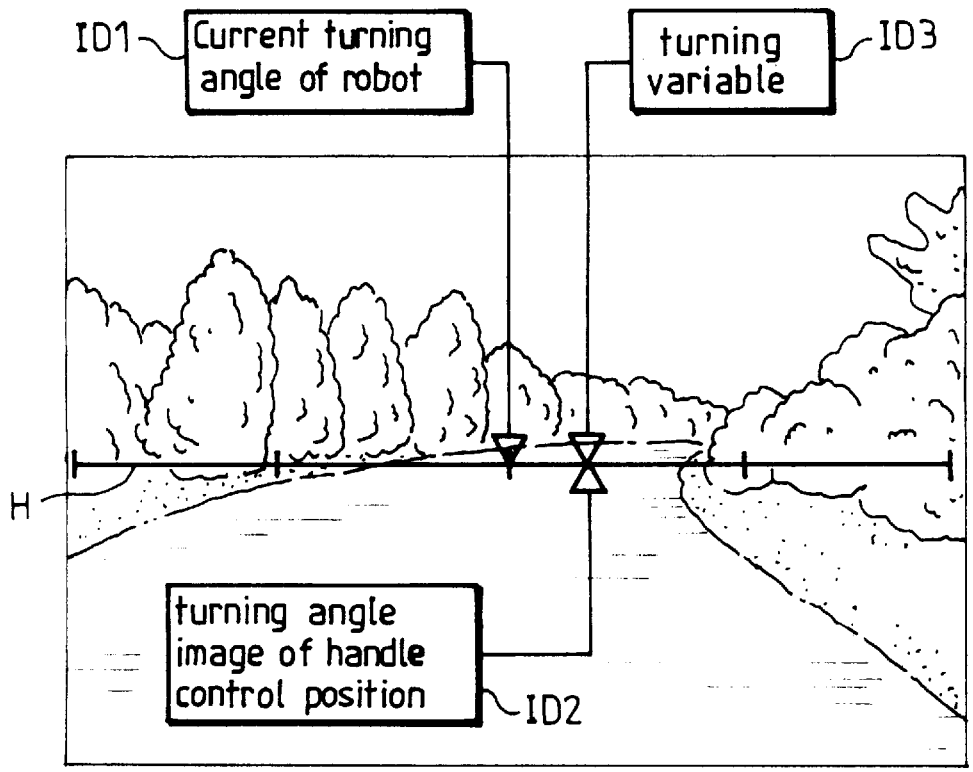
FIG. 14 shows diagrammatically the image displayed of the environment in which the vehicle is moving inlaid with indicators of mobility mode by turning.

With reference to FIG. 14, the mobility mode by turning control MOD3 in association with the selection and validation of an operator variable relating to the longitudinal cruising speed of the vehicle VOP comprises the following stages:

1) provide on the image displayed an axis H forming a virtual horizon for the vehicle in the environment in which it is moving,
2) provide on the horizon H a first indicator ID1 capable of moving along said horizon and of indicating the current turning LC of the vehicle on the horizon,
3) provide on the horizon H a second indicator ID2 capable of moving along said horizon H and of indicating the reflection of the current position of the handle control JOY, 4) provide on the horizon H a third indicator ID3 capable of moving along said horizon H and of indicating the operator variable relating to the turning of the vehicle LOP, and 5) select and validate, by means of the control JOY, the operator variable relating to the turning LOP by means of the first and second indicators ID1 and ID2.

This control only involves the transverse displacement of the vehicle. The speed variable VOP is in this case generated in the same way as remote piloting by turning speed control (mode MOD4).

The turning control MOD3 in this case consists of an orientation variable of the longitudinal axis of the vehicle relative to its current orientation. Such an approach makes it possible not to need a true and absolute course datum (magnetic or geographical) inside the installation.

The current orientation ID1 of the vehicle is in this case a datum impressed on the video image. It is generated by virtue of location data originating from the vehicle.

With reference to FIG. 14, the detailed modus operandi of the mode MOD3 is as follows:

The operator displays the virtual horizon H on which are indicated the current turning of the vehicle ID1 and the indicator ID2 which he can work out with his handle control. The operator aims with the indicator ID2 at a particular point in the landscape towards which he wishes to go and validates the variable ID3 thus defined with the trigger.

Each time the trigger is actuated, a new turning variable ID3 is sent to the vehicle and displayed on the horizon H.

The vehicle automatically controls the vehicle turning on the variable ID3 and thus directs the vehicle in the required direction.

This control is particularly adapted to off-road progress by successively designating landmarks.

Since the field of designation is restricted by the angle of aperture of the camera, the full transverse range cannot be requested in an unforeseen situation.

Advantageously, if the operator keeps his turning variable validated (trigger permanently held down), the variable becomes a turning speed, thus making it possible to obtain the full dynamic range of the vehicle.

It is therefore the trigger, during displacement of the vehicle, which makes it possible to change from mobility mode by turning speed control to mobility mode by turning control and vice versa.

The safety mechanisms for speed adaptation described above are still active in this mode of control of the vehicle.

It should be noted that a certain operator variable, in this case VOP of the mobility modes MOD4 and MOD3, arriving at the vehicle is associated with a spatial validity.

This spatial validity corresponds to the validity of a distance for the associated operator variable VOP. Thus, in the absence of at least one new operator variable VOP after traversing the validity distance associated with the preceding operator variable, the control means of the vehicle trigger halting of the vehicle until at least one new operator variable is received.

More precisely, this spatial validity consists in a distance dependent on the value of the operator variable VOP. This spatial validity represents the confidence that the operator has in the trajectory which he requests of the vehicle (dependent on his current visibility distance).

For example, the size of this reference distance for a speed variable VOP of 1 m/sec is 1 m, whereas it is 5 m for a speed variable VOP of 22 m/sec.

The temporary problems of transmission of the operator variables become neutral for the vehicle, which can thus cover small areas of difficulty without even adopting a scrambled behaviour.

In the case of a serious problem of transmitting operator variables, where only a few frames per minute are passed, the reception of a new single operator speed variable other than zero can make the vehicle advance by a leap which is bigger the higher the variable. Such progress by leaps thus makes it possible for the vehicle to reach a zone which might be more favourable to the reception and communication of operator variables.

Figure 15:
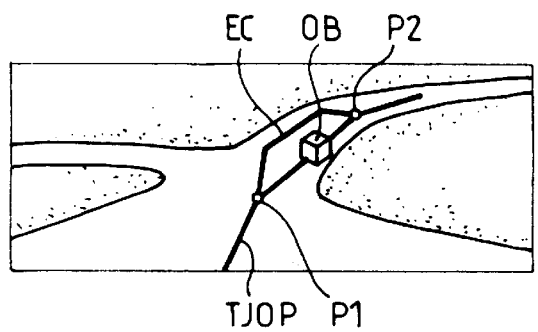
FIG. 15 shows diagrammatically the image displayed showing how an automatic swerve is effected according to the invention.

With reference to FIG. 15, the mobility mode by points of passage MOD1, in association with the validity of an operator variable relating to the longitudinal cruising speed VOP comprises the following stages:

designate in the image displayed a plurality of points of passage P1, P2 forming an operator trajectory TJOP, the vehicle having to go and stop at the last point P2 of the operator trajectory;

validate the entirety or part of the operator trajectory TJOP thus designated, and on the side of the vehicle control means, work out the first and second reference variables CREF1 and CREF2 as a function of the operator trajectory TJOP thus validated and of the current position of the vehicle.

Validation of the points is carried out via the trigger. The button MA in "send" position makes it possible to send all the points thus validated to the vehicle. The button in the "cancel" position makes it possible to cancel at least one of the points of the trajectory.

In the mode MOD1, the vehicle is automatically controlled on the operator trajectory TJOP, maintaining an associated margin. The vehicle is therefore free to go where it wants provided that its distance from the trajectory remains lower than this automatic control margin.

Advantageously, this mobility mode MOD1 by points of passage comprises in addition an autonomous behaviour of the vehicle of the "swerve" type.

This autonomous behaviour is known as swerve-type reflex action. It may be automatic or operate in response to the command of the operator in order to avoid an obstacle if necessary.

When an obstacle is detected on the immediate trajectory of the vehicle, a swerve consists in effecting a deviation EC (decided and managed in association with the dynamic potential of the vehicle) relative to the operator trajectory TJOP, so as to avoid the obstacle by maintaining the specified margin.

It should be noted that this behaviour is independent on the shape of the trajectory, whether a straight line or a bend.

This is a guidance reflex reaction which will handle the situation until the danger has been removed (obstacle bypassed) or until it is taken into account by the higher level, which will generate a new trajectory free of any obstruction.

The automatic swerve comprises four phases:

if necessary braking on the operator trajectory TJOP unless the swerve is judged impossible;

deviation from trajectory at stabilised speed, depending on the size of the obstacle and its position relative to the trajectory;

continuing the deviation until the obstacle has been bypassed;

returning to the original operator trajectory after bypassing.

This autonomous mode requires the provision of detection means on the vehicle for detecting an obstacle on the operator trajectory of the vehicle.

These detection means are for example of the radar, infrared sensor, ultrasound sensor, or scanning laser type.

Complementary to the mobility mode by points of passage MOD1, the operator has the possibility of reacting rapidly to the mobility conditions (appearance of a particular event such as an obstacle on the trajectory for example), by commanding an operator swerve consisting of a deviation in speed and/or in the transverse direction relative to the current variables used by the vehicle.

The vehicle interprets this information in the same way as when a swerve is triggered automatically at the appearance of an obstacle, and manages the dynamics of the deviation in a stabilised manner.

Thus an obstacle appearing on the trajectory TJOP of the vehicle (emerging from a series of points of passage for example) is avoided by the operator, who simply specifies a lateral operator deviation EC provided that the obstacle has not been passed, and by then cancelling this operator deviation in order to resume the original trajectory.

For example, for a deviation in speed, a brake pedal is provided in the operator post on which any action brings about the transmission to the vehicle of a command to reduce the current cruising speed proportional to the intensity of the operator action.

For deviations from the trajectory, it is proposed to use the handle control in its transverse axis associated with a specific taking over of control, whereby it is possible to specify a deviation proportional to that imposed on the handle control.

Obviously, in this swerve mode by the operator, the device or servomechanism for adapting the speed is also capable of being applied.

The data transmission/reception means operating between the station and the vehicle may use any technology, for example radio technology, cable technology using fibreoptic or electrical cable, or the like.

We claim:

1. Device for controlling a vehicle (VH) comprising:
   first sensor means (CAP1) for picking up and supplying a first signal (S1) representing the current longitudinal speed of the vehicle,
   second sensor means (CAP2) for picking up and supplying a second signal (S2) representing the current transverse speed of the vehicle,
   first means (ACT1) for actuating a motor element in accordance with a first selected actuator order (CACT1) to displace the vehicle longitudinally,
   second means (ACT2) for actuating a steering element in accordance with a second selected actuator order (CACT2) to displace the vehicle transversely,
   vehicle control means (COMV) for receiving first and second reference orders (CREF1 and CREF2) to control respectively the motor and steering elements of the vehicle and determining the first and second actuator orders (CACT1 and CACT2) according to a servomechanism which takes into account at least the supplied first and second signals (S1 and S2) and the first and second reference orders (CREF1 and CREF2), and
   the servomechanism, in response to the second reference order (CREF2), repeatedly adjusts the first actuator order (CACT1), relating to the longitudinal speed of the vehicle, based on the supplied first and second signals (S1 and S2), so that the second actuator order (CACT2) eventually corresponds to the second reference order (CREF2).

2. Device according to claim 1, wherein the servomechanism for adjusting the first actuator order relating to the longitudinal speed further comprises the following stages:

a) calculate a first maximum acceptable value (MAX1) for the first reference order (CREF1) according to a first equation (L1) dependent on the supplied first and second signals (S1 and S2) and having at least one of characteristics relating to the vehicle (VH) and the environment in which it is moving,
   b) compare the first maximum acceptable value (MAX1) with the first reference order (CREF1),
   c) in the presence of a first reference order (CREF1) which is lower than the first maximum acceptable value calculated (MAX1), take into account the first reference order (CREF1) as first actuator order (CACT1), while in the presence of a first reference order (CREF1) which is higher than or equal to the first maximum acceptable value calculated, take into account the first value calculated (MAX1) as first actuator order,
   d) calculate a second maximum acceptable value (MAX2) for the second reference order (CREF2) according to a second equation (L2) dependent on the supplied first and second signals (S1 and S2) and on the at least one of characteristics relating to the vehicle and to the environment in which it is moving,
   e) compare the second maximum acceptable value calculated (MAX2) with the second reference order (CREF2),
   f) in the presence of a second reference order (CREF2) which is lower than the second maximum acceptable value calculated (MAX2), take into account the second reference order (CREF2) as a second actuator order (CACT2), while in the presence of a second reference order (CREF2) which is higher than or equal to the second value calculated (MAX2), take into account the second value calculated (MAX2) as second actuator order (CACT2),
   the adjusting of the first actuator order (CACT1) being carried out in accordance with stages a) to c) until the second actuator order (CACT2) corresponds as rapidly as possible to the second reference order (CREF2) in accordance with stages d) to f), while taking into account at least one of certain characteristics of the vehicle and of the environment in which it is moving.

3. Device according to claim 2 wherein the stage c) of the servomechanism further provides, in the presence of a first reference order (CREF1) which is higher than or equal to the first maximum acceptable value calculated (MAX1), starting the servomechanism to adjust the first actuator order by initialization of the value of the preceding first actuator order (OLDCACT1) according to the first actuator order just determined (OLDCACT1=CACT1), when the servomechanism is not adjusting the first actuator order.

4. Device according to claim 3 wherein the stage b) of the servomechanism further comprises the following stages:
   b1) determine a constant value representing a predetermined hysteresis value of the servomechanism (HYST1),
   b2) compare the first maximum acceptable value calculated and corrected according to the predetermined hysteresis value (MAX1−HYST1) with the first reference order (CREF1), and stage c) of the servomechanism further comprises the following stage:
   c1) in the presence of a first reference order (CREF1) which is lower than the first maximum acceptable value calculated and corrected (MAX1−HYST1), the first reference order (CREF1) is taken as the first actuator order (CACT1) and the servomechanism is stopped from adjusting the first actuator order, while in the presence of a first reference order (CREF1) which is higher than or equal to the first maximum acceptable value calculated and corrected (MAX 1−HYST1), a minimum value chosen from a group formed by the first maximum acceptable value calculated (MAX1), the first reference order (CREF1) and the preceding first actuator order (OLDCACT1) is taken as a first actuator order, and the value of the preceding first actuator order is initialized to that of the first current actuator order (OLDCACT1=CACT1), when the servomechanism is adjusting the first actuator order.

5. Device according to claim 2 wherein the characteristics relating to the vehicle (VH) are selected from the group formed by geometric, morphological, dynamic and attitude characteristics of the vehicle (VH), and the preceding first and second reference orders (CREF1 and CREF2).

6. Device according to claim 1 wherein the first sensor means (CAP1) comprise at least one instrument selected from the group formed by an encoder on a transmission shaft and wheel and a tachometer.

7. Device according to claim 1 wherein the second sensor means (CAP2) comprise at least one instrument selected from the group formed by a wheel angle encoder, and a wheel angle potentiometer.

8. Device according to claim 1 wherein the first actuator means (ACT1) comprise at least one element selected from the group formed by a link for controlling a brake (ACT3), accelerator (ACT5), gearbox (ACT4), power divider, and a mechanical transmission chain of the vehicle.

9. Device according to claim 1 wherein the second actuating means (ACT2) comprise a link for controlling the vehicle steering.

10. Device according to claim 1 wherein the vehicle control means (COMV) comprise an on-board computer.

11. Device according to claim 1 wherein the actuator means (ACT1, ACT2) together with the motor and steering elements of the vehicle form active means of the vehicle capable of delivering respectively a signal (RCACT) representing at least one of the position and current state of the active means, and said device further comprising means for receiving signals transmitted by the active means of the vehicle.

12. The device according to claim 11 wherein
the vehicle control means (COMV) determines, at a selected rate, the first and second actuator orders (CACTI and CACT2) in response to the first and second reference orders (CREF1 and CREF2) calculated at least in part from operator orders (COP) from an operator via a remote station (ST) and the device further comprising:
photographing means (PV) for recording images of an environment (IMG) in which the vehicle (VH) is moving, and
vehicle data transmission/reception means cooperating with the remote station (ST) for transmitting the images recorded to the remote station, as well as the data transmitted by the active means and sensors of the vehicle and for receiving the operator orders (COP) from the operator via the remote station, the remote station (ST) comprising:
station data transmission/receiving means cooperating with the vehicle (VH) for receiving the images (IMG) transmitted by the vehicle as well as the data transmitted by the active means and sensors of the vehicle, and for transmitting the operator orders (COP) to the vehicle,
visual display means (VISU) for displaying the images thus received,
selection and validation means (SEL) for selecting and validating at least some operator orders relating to the movement of the vehicle with the aid of the images displayed, and data originating from the active means and sensors of the vehicle, and
station control means (COMS) for manipulating the display means, the selection and validation means, and the station data transmission/receiving means of the station.

13. The device according to claim 12 further comprising:
locating means (CAP4) of the vehicle capable of picking up and sending data (S4) relating to the location of the vehicle, and the remote station further comprising:
means for generating on the image displayed data relating to a current position of the vehicle in accordance with the data relating to the location of the vehicle and determining at least some of the operator orders.

14. The device according to claim 13 wherein the vehicle control means determines a certain operator order of a certain mobility mode associated with a validity distance corresponding to the spatial validity of the operator order, and in the absence of at least one new operator order after passing through the validity distance, the vehicle control means (COMV) halts the vehicle until at least one new operator order is received.

15. The device according to claim 12 wherein the selection and validation means (SEL) are capable of selecting a predetermined mobility mode (MOD) of the vehicle, selected from the group formed by mobility mode by points of passage (MOD1), mobility mode by segment (MOD2), mobility mode by turning control (MOD3) and mobility mode by speed turning control (MOD4).

16. The device according to claim 15 wherein each mobility mode (MOD) is exclusive from each other.

17. The device according to claim 16 wherein the handle control (JOY):
is able to designate in the image displayed a plurality of points of passage forming an operator trajectory (TJOP), the vehicle having to go and stop at the last point on the operator trajectory,
and to validate an entirety or part of the operator trajectory (TJOP) thus designated, and
the vehicle control means (COMV) determines at a selected rate the different first and second reference orders (CREF1 and CREF2) as a function of the operator trajectory (TJOP) thus validated and of a current position of the vehicle, when the selected mobility mode of the vehicle is the mobility mode by points of passage (MOD1), in association with the validation of an operator order relating to a longitudinal cruising speed.

18. The device according to claim 17 further comprising means for a swerve-type autonomous behavior of the vehicle with a view to avoiding an obstacle if necessary.

19. The device according to claim 18 wherein the means for the swerve-type autonomous behavior being implemented automatically and the device further comprising:
detection means for detecting an obstacle on the operator trajectory (TJOP) of the vehicle,
deviation means for effecting a deviation from the operator trajectory of the vehicle so as to avoid the obstacle thus detected, while taking into account an operator margin, the deviation being carried out at a longitudinal speed compatible with at least one of the characteristics of the vehicle and of the environment in which it is moving, for maintaining the deviation until the obstacle has been passed, and for returning to the operator trajectory (TJOP) of the vehicle.

20. The device according to claim 18 wherein the means for the swerve-type autonomous behavior being implemented in response to an order from the operator and the device further comprising:

means for determining an operator deviation relative to the operator trajectory (TJOP), in response to a selected event by the operator, and for determining at a selected rate the different first and second reference orders, taking into account the operator deviation from the current position of the vehicle relative to the operator trajectory (TJOP).

21. The device according to claim 15 wherein the selection and validation means (SEL) comprise a keyboard (CLA) for selecting the mobility mode (MOD) of the vehicle.

22. The device according to claim 15 wherein the selection and validation means (SEL) comprise a handle control (JOY) for selecting and validating certain operator orders and a lever (MAN) associated with the selection and validation of the operator orders relating to a longitudinal cruising speed of the vehicle.

23. The device according to claim 22 wherein the handle control (JOY) comprises means for designating on the image displayed an operator segment (SGOP) of variable length, having initial (EX1) and final (EX2) mobile extremities, the initial mobile extremity (EX1) being connected to a fixed point (PF) of the image corresponding to a fixed point chosen on the vehicle and the final extremity (EX2) defining a point in the environment where the vehicle must go and stop, when the selected mobility mode of the vehicle is the mobility mode by segment (MOD2).

24. The device according to claim 23 wherein:

the handle control (JOY) is capable of selecting and validating on the image displayed an operator segment of selected length and orientation (SGOP), and the vehicle data transmission/reception means transmit to the vehicle control means (COMV) the operator segment thus selected and validated (SGOP), and the vehicle control means (COMV), calculate at a selected rate, the values of the different first and second reference orders (CREF1 and CREF2) in accordance with the operator orders thus received, and determine the first and second actuator orders (CACT1 and CACT2) in accordance with the first and second reference orders thus calculated (CREF1 and CREF2).

25. The device according to claim 24 wherein the handle control is capable of being moved by the operator along a Y axis perpendicular to an axis of longitudinal displacement of the vehicle, in order to displace the final extremity (EX2) of the operator segment (SGOP) along the Y axis, and the operator segment (SGOP) being parallel to the axis of longitudinal displacement of the vehicle.

26. The device according to claim 24 wherein the handle control is capable of being moved by the operator along a X axis perpendicular to an axis of longitudinal displacement of the vehicle, in order to displace the final extremity (EX2) of the operator segment (SGOP) along the X axis, and the operator segment (SGOP) being parallel to the axis of longitudinal displacement of the vehicle.

27. The device according to claim 24 wherein the handle control is capable of being rotated by the operator relative to a Z axis perpendicular to the axis of longitudinal displacement of the vehicle, in order to apply a curvature to the initial extremity (EX1) and final extremity (EX2) of the operator segment (SGOP) relative to the Z axis.

28. The device according to claim 24 further comprising:

means for determining an operator margin granted by the operator to the vehicle operating automatically over the operator segment (SGOP) thus validated, and the vehicle control means takes into account the operator margin.

29. The device according to claim 22 wherein the handle control is capable of being moved by the operator along a Y axis perpendicular to the axis of longitudinal displacement of the vehicle, in order to apply an operator order relating to turning speed of the vehicle in a first range of turning speed (PG1), while the handle control is capable of being rotated by the operator relative to a Z axis perpendicular to the axis of longitudinal displacement of the vehicle in order to apply an operator order relating to the turning speed in a second speed range (PG2) different from the first range (PG1), when the selected mobility mode of the vehicle is the mobility mode by turning speed control (MOD4) in association with the selection and validation of an operator order relating to the longitudinal cruising speed of the vehicle.

30. The device according to claim 22 wherein the visual display means provide on the image displayed an axis forming a virtual horizon for the vehicle in the environment in which it is moving, provide on the horizon a first indicator (ID1) capable of moving along said horizon and of indicating current turning (LC) of the vehicle on the horizon, provide on the horizon a second indicator (ID2) capable of moving along the horizon and of indicating a reflection of a current position of the handle control (JOY), provide on the horizon a third indicator (ID3) capable of moving along the horizon and of indicating the operator order relating to the turning of the vehicle, and the handle control (JOY) is capable of selecting and validating the operator order relating to the turning by using the first and second indicators (ID1 and ID2), when the selected mobility mode of the vehicle is the mobility mode by turning control (MOD3) in association with the selection and validation of an operator order relating to the longitudinal cruising speed of the vehicle.

31. The device according to claim 30 wherein the handle control (JOY) is able to change, while the vehicle is moving, the selected mobility mode of the vehicle from the mobility mode by turning speed control (MOD4) to the mobility mode by turning control (MOD3) and vice versa.

32. The device according to claim 22 wherein the handle control (JOY) further comprises means for designating on the image displayed at least one point defining the point in the environment where the vehicle must go and stop, when the selected mobility mode of the vehicle is the mobility mode by points of passage (MOD1).

33. The device according to claim 12, wherein the transmission/reception means of the station and of the vehicle communicate with one another according to a suitable communication technology selected from the group formed by radio technology and cable technology using fibre optic or electrical cable.

* * * * *